(12) United States Patent
Holland et al.

(10) Patent No.: US 10,885,686 B2
(45) Date of Patent: Jan. 5, 2021

(54) PAGES SHARING AN IMAGE PORTION

(71) Applicant: Hewlett-Packard Development Company, L.P., Houston, TX (US)

(72) Inventors: Steven Holland, Boise, ID (US); John D Wilcox, Jr., Boise, ID (US); Charles M Rekiere, Garden City, ID (US); Sean Michael Collison, Meridian, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 543 days.

(21) Appl. No.: 15/327,923

(22) PCT Filed: Jul. 28, 2014

(86) PCT No.: PCT/US2014/048405
§ 371 (c)(1),
(2) Date: Jan. 20, 2017

(87) PCT Pub. No.: WO2016/018214
PCT Pub. Date: Feb. 4, 2016

(65) Prior Publication Data
US 2017/0206687 A1 Jul. 20, 2017

(51) Int. Cl.
*G06T 11/60* (2006.01)
*G06Q 50/10* (2012.01)
*G06T 1/60* (2006.01)
*G06F 40/106* (2020.01)

(52) U.S. Cl.
CPC ............ *G06T 11/60* (2013.01); *G06F 40/106* (2020.01); *G06Q 50/10* (2013.01); *G06T 1/60* (2013.01)

(58) Field of Classification Search
CPC ............................... G06T 11/60; G06F 17/212
USPC .......................................................... 715/204
See application file for complete search history.

(56) References Cited

U.S. PATENT DOCUMENTS 4,677,575 A * 6/1987 Redin ...................... G09G 5/42
345/441
4,947,269 A 8/1990 Yamada
5,481,375 A 1/1996 Eto et al.
7,145,681 B2 12/2006 Kato
(Continued)

FOREIGN PATENT DOCUMENTS

EP 0527097 2/1993

OTHER PUBLICATIONS

Alegre, M.F., "Memory Efficient Algorithms for Raster Document Image Compression," (Dissertation ~ Purdue University), Aug. 2008 ~ 84 pages.
(Continued)

*Primary Examiner* — Andrew R Dyer
(74) *Attorney, Agent, or Firm* — Trop Pruner & Hu PC

(57) ABSTRACT

An image is to be shared across a plurality of pages. Versions of attribute information are computed for the image, each of the versions of the attribute information associated with a respective different page of the plurality of pages, each version of the attribute information specifying a respective arrangement of at least a portion of the image in the respective page of the plurality of pages. The plurality of pages are produced for output using the respective versions of the attribute information, the produced pages for output each including at least a portion of the image.

14 Claims, 5 Drawing Sheets

(56) References Cited

U.S. PATENT DOCUMENTS

| | | |
|---|---|---|
| 7,212,217 B1 | 5/2007 | Feather et al. |
| 2002/0071615 A1 | 6/2002 | Kobayashi et al. |
| 2003/0016390 A1 | 1/2003 | Yuasa |
| 2004/0099741 A1* | 5/2004 | Dorai .................. G06K 7/14 235/462.08 |
| 2004/0109197 A1 | 6/2004 | Casey et al. |
| 2006/0171254 A1 | 8/2006 | Onishi et al. |
| 2007/0206221 A1* | 9/2007 | Wyler ............... G06F 17/30905 358/1.15 |
| 2009/0010566 A1 | 1/2009 | Meijers |
| 2010/0002096 A1 | 1/2010 | Hong |
| 2011/0181912 A1 | 7/2011 | Miyata et al. |

OTHER PUBLICATIONS

Wikipedia, Adobe Photoshop dated Jul. 2014 (10 pages).

* cited by examiner

PAGES SHARING AN IMAGE PORTION

BACKGROUND

An image of an object can be captured using one of various different types of image capture devices, such as a physical document scanner, a camera, and so forth. The image can be included as part of a larger page that can be output, such as printed, displayed, communicated, stored, and so forth.

BRIEF DESCRIPTION OF THE DRAWINGS

Some implementations are described with respect to the following figures.

DETAILED DESCRIPTION

A media production system is able to produce a page for output, such as printing, displaying, storing, communicating (e.g. emailing or communicating over a network), and so forth. Examples of a media production system include a printer (e.g. a multi-function printer that includes a scanner and a printing unit, a printer without scanning functionality), a camera, a handheld computing device (e.g. a smartphone, a personal digital assistant, etc.), a computer (e.g. a tablet computer, a notebook computer, a desktop computer, a server computer, etc.), or any other system that is able to generate pages containing images for output. A "system" can refer to an electronic device, an arrangement of electronic devices, a processor, an arrangement of processors, and so forth.

An image can refer to a digital representation of an object, which can be a document, a person, or any other type of object. A page can refer to a digital representation that contains one or multiple images, as well as other content (e.g. text, etc.), where the page is in a format that is ready for output (printing, displaying, communicating, storing, etc.) by the media production system.

The media production system can produce multiple pages for output. In some cases, an image (or a portion of an image) may be shared by multiple pages. Traditionally, when sharing an image portion across multiple pages, the shared image portion is duplicated in memory of the media production system, with the duplicated image portions included in the respective pages. Such duplication of the shared image portion in memory can result in inefficient use of the memory storage capacity.

In accordance with some implementations, to avoid such duplication of an image portion that is to be shared across multiple pages, attribute information can be generated for the shared image portion. The attribute information can be used for arranging the shared image portion in the multiple pages. Multiple versions of the attribute information for the shared image portion can be generated, where at least some of the versions of the attribute information can differ due to different arrangements of the shared image portion in respective pages. For example, the shared image portion can be arranged in a first page in a first manner, and arranged in a second page in a second, different manner. The manner in which a shared image portion is arranged within a page can include one or some combination of: a position of the shared image portion, an orientation of the shared image portion, or another feature that affects a placement or other characteristic of the shared image portion in the page.

Figure 1:
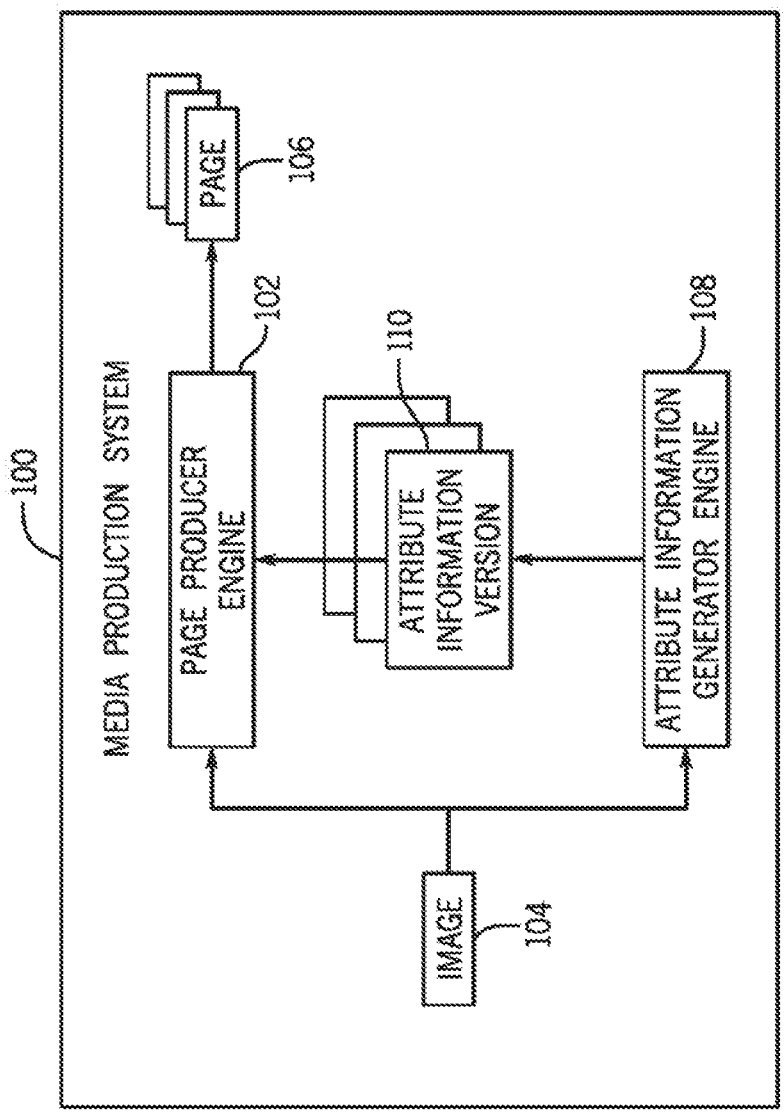
FIG. 1 is a block diagram of an example media production system according to some implementations.

FIG. 1 is a block diagram of an example media production system 100 that includes a page producer engine 102 that can receive an image 104. At least a portion of the image 104 is to be included in a page that is produced by the page producer engine 102 for output. In the example of FIG. 1, the page producer engine 102 is able to produce multiple pages 106 for output by the media production system 100. For example, the media production system 100 can be a printer to print the pages 106. Alternatively, the media production system 100 can display the pages 106, communicate the pages 106, store the pages 106, and so forth.

The image 104 can be received by the media production system 100 from an external source, such as over a network or a communication link (wired or wireless link). Alternatively, the media production system 100 can include an image capture device to capture the image 104 of an object. The image capture device can be a scanner, a camera, or any other device that is capable of capturing an image.

Multiple versions 110 of attribute information can be generated for respective pages 106. In the example of FIG. 1, it is assumed that the image 104 (or a portion of the image 104) is shared by the pages 106 produced by the page producer 102. Thus, each attribute information version 110 is associated with a respective one of the pages 106 that shares the image 104. The attribute information versions 110 are generated by an attribute information generator engine 108, based on processing of the image 104.

In the ensuing discussion, reference is made to sharing an image across multiple pages, and providing attribute information for the shared image. Note, however, that reference to sharing an image or providing attribute information for the shared image can also refer to sharing a portion of the image or providing attribute information for a portion of the shared image.

As noted above, some of the attribute information versions 110 can differ from each other due to different arrangements of the image 104 in the respective pages 106. However, others of the attribute information versions 110 can be duplicate copies of each other, due to the same arrangement of the image 104 in respective other pages 106.

Generally, each attribute information version 110 specifies an arrangement of the image 104 in a respective page 106. The arrangement of the image 104 can include one or some combination of: a position of the image in the respective page 106, an orientation of the image in the page 106, or another feature that affects a placement or another characteristic of the shared image in the page. The position of the image in a page refers to a specific location within the page at which the image is to be positioned. The location can be expressed as an offset from a base address, for example. An orientation of the image can refer to a rotation angle of the image. As another example, an orientation of the image can refer to whether a horizontal or vertical flip is to be applied to the image. An example characteristic of the image is a characteristic relating to whether cropping is to be applied. The attribute information for the image can also include other information, such as a size of the image (portion), whether the image is in color or monochrome, and so forth.

In some examples, the attribute information can be in the form of a table of contents (ToC) for the image 104. The image 104 can be divided into multiple portions, referred to as "tiles." The tiles can all have the same size, or alternatively, at least some of the tiles can have irregular sizes and/or shapes that differ from those of other tile(s). The tiles can be arranged as an array of tiles. In some examples, the tiles are in a two-dimensional array with no overlap between the tiles. In other examples, some of the tiles may overlap.

The ToC includes multiple entries for the respective tiles, where each entry of the ToC includes metadata for the respective tile. The metadata can specify the arrangement of each tile (e.g. position, orientation, etc.) as well as other attributes of the tile. The ToC is an example of a data structure including entries that store metadata for respective tiles, where the data structure is able to provide information to enable the media production system to link the tiles together to form an image having a specific arrangement and order of the tiles.

Once the image 104 is divided into multiple tiles, the attribute information generator engine 108 is able to provide metadata for the respective tiles and to include the metadata in the entries of the ToC.

Each of the engines discussed in the present disclosure may include hardware or a combination of hardware and programming to implement the functionalities of the respective engine. Such combinations of hardware and programming may be implemented in a number of different ways. For example, the programming for an engine may include executable instructions stored on a non-transitory machine-readable storage medium and the hardware for the engine may include processor(s) to execute those instructions. In such examples, the machine-readable storage medium may store instructions that, when executed by the processor(s), implement functionalities of the engine. A processor can include a microprocessor, microcontroller, programmable integrated circuit, programmable gate array, or any combination of the foregoing.

Figure 2:
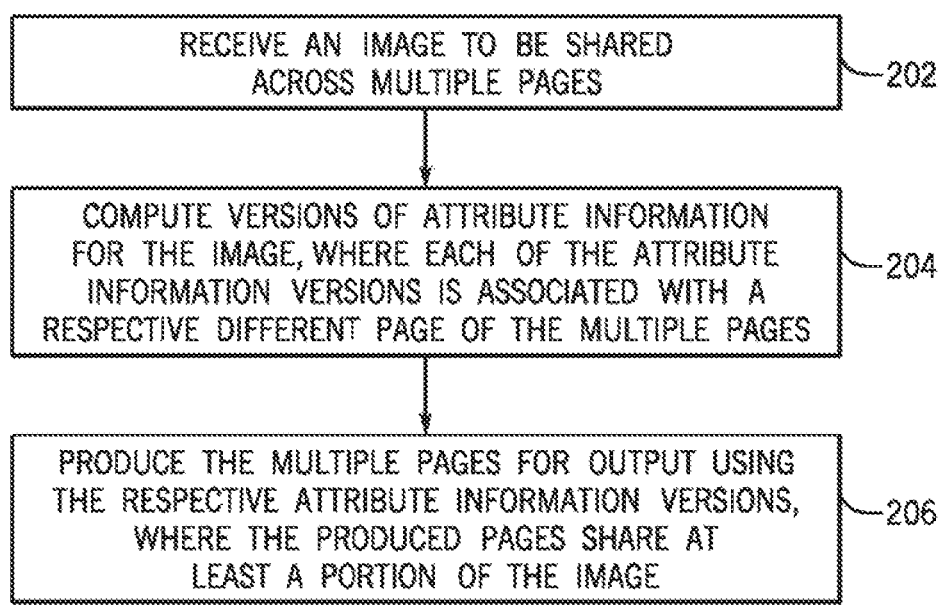
FIG. 2 is a flow diagram of an example process according to some implementations.

FIG. 2 is a flow diagram of a process that can be performed by the media production system 100, according to some implementations. The media production system 100 receives (at 202) an image to be shared across multiple pages (note that either the entire image or a portion of the image is to be shared across multiple pages).

The attribute information generator engine 108 of the media production system 100 computes (at 204) versions of attribute information for the image (e.g. attribute information versions 110 in FIG. 1). Each of the attribute information versions is associated with a respective different page of the multiple pages.

The page producer engine 102 produces (at 206) the multiple pages for output using the respective attribute information versions, where the produced pages for output share at least a portion of the image.

By using techniques or mechanisms according to some implementations, the usage of memory of a media production system is reduced, since duplicate copies of a shared image (portion) do not have to be stored. In this way, the memory footprint used for producing pages for output is reduced, which frees up memory resources for use by other tasks.

Figure 3:
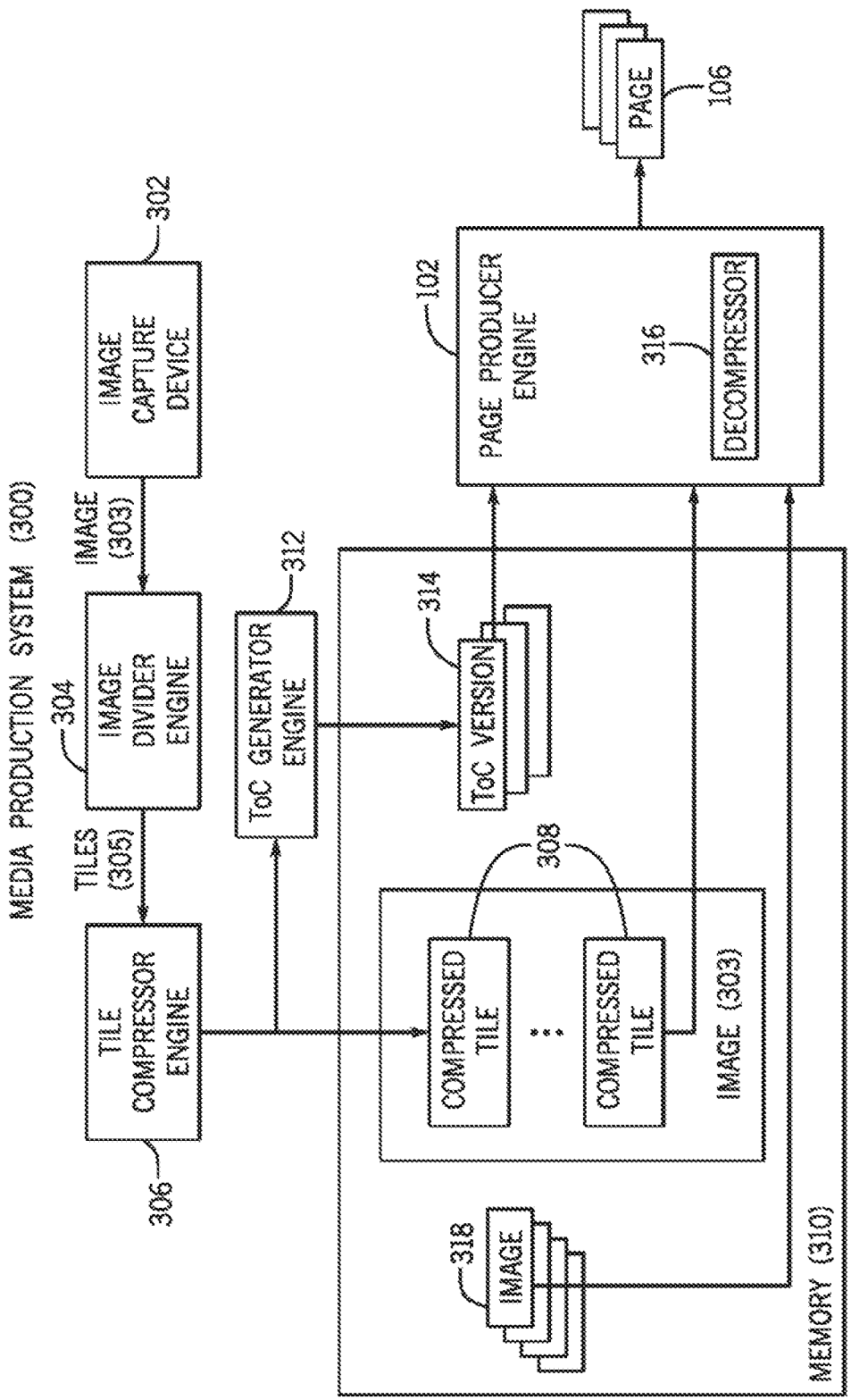
FIG. 3 is a block diagram of another example media production system according to further implementations.

FIG. 3 is a block diagram of a media production system 300 according to further implementations. The media production system 300 includes a page producer engine 102 similar to the page producer engine 102 of FIG. 1 for producing pages 106 for output. The media production system 300 includes an imaging capture device 302, which is able to capture an image of an object. The image capture device 302 outputs an image 303 to an image divider engine 304, which divides the image 303 into tiles 305. In other examples, the image capture device 302 can be omitted, with the media production system 300 receiving the image 303 from an external device.

The tiles 305 generated by the image divider engine 304 are provided to a tile compressor engine 306. The tile compressor engine 306 compresses the tiles to reduce the size of each of the tiles. In other words, the compressed tile can include less information than the respective portion of the image 304. The compressed tiles 308 of the image 303 are stored in a memory 310 of the media production system 300.

A ToC generator engine 312 produces a ToC that links the tiles of the image 303. The ToC generator engine 312 is an example of the attribute information generator engine 108 discussed in connection with FIG. 1. The ToC produced by the ToC generator engine 312 includes metadata for the respective tiles. If the image 303, or any subset of the tiles 308 of the image 303, is to be shared by multiple pages 106, then the ToC generator engine 312 generates multiple ToC versions 314, one for each respective page 106. The ToC versions 314 can also be stored in the memory 310, for example.

Although FIG. 3 shows the memory 310 as a block, it is noted that the memory 310 can refer to one or multiple memory devices.

The page producer engine 102 can include a decompressor 316 to decompress the compressed tiles 308. Using a respective ToC version 314, the page producer engine 102 arranges the decompressed tiles output by the decompressor 316 for inclusion in a corresponding page 106. In addition to arranging decompressed tiles in a corresponding page, the page producer engine 102 can also apply processing on each tile based on metadata in an entry of the ToC corresponding to the tile. By way of example, the processing applied on the tile can include one or some combination of the following: rotation of the tile, vertical/horizontal mirroring of the tile, alpha blending of the tile with a background image, cropping of the tile, and so forth.

Vertical/horizontal mirroring of the tile can refer to flipping the tile along the vertical or horizontal axis. Alpha blending the tile with a background image can refer to combining a translucent foreground color with a background color, to produce a new blended color. Cropping the tile refers to removing an outer part of an image portion represented by the tile.

A page 106 produced by the page producer 102 can include multiple images. Each image is associated with a respective ToC. In some examples, the page producer 102 can link together the ToCs for the different images contained in a page. For a given page 106 that has multiple images (including images 308 and the shared image 303, for example), the ToCs that are linked together include a respective ToC version 314 of the shared image 303 for the given page 106, as well as ToCs of other images 318. Linking ToCs of images, in some examples, can be accomplished by including a next ToC descriptor pointer in one ToC to point to the next ToC entry. By linking the ToC entries of the images, the images can be properly arranged in the page.

More generally, the media production system 300 of FIG. 3 includes a first engine to divide an image into a plurality of tiles; a second engine to generate a plurality of versions of attribute information for the tiles of the image; a third engine to associate the plurality of versions of the attribute information with respective pages that share at least one tile of the image, the plurality of versions including a first version associated with a first of the pages that differs from a second version associated with a second of the pages; and a fourth engine to arrange the shared at least one tile in a first page for output using a respective one of the versions of the attribute information. Note that at least some of the first, second, third, and fourth engines can be part of the same engine.

Figure 4:
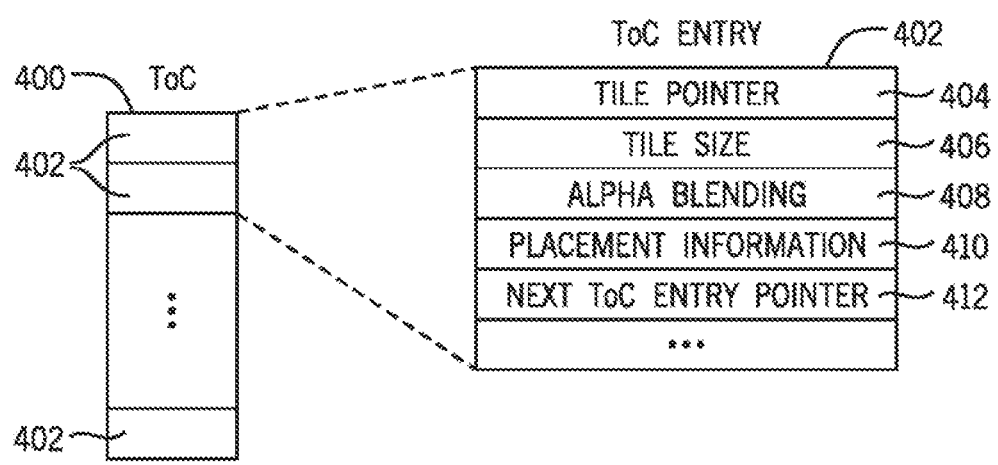
FIG. 4 is a schematic diagram of an example table of contents and entries of the table of contents, according to some implementations.

FIG. 4 is a schematic diagram of an example ToC 400 for a respective image. If the image is to be shared by multiple pages, then multiple versions of the ToC 400 can be generated by the ToC generator engine 312 of FIG. 3.

The ToC 400 includes multiple entries 402 (referred to as "ToC entries"). Each ToC entry 402 corresponds to a respective tile of an image. The ToC entry 402 includes various elements, including a tile pointer element 404, which can include a tile pointer that points to a compressed tile (e.g. 308) stored in the memory 310 (FIG. 3).

Another element of the ToC entry 402 is a tile size element 406, which specifies the size of the respective tile (which can be a compressed tile). An alpha value element 408 in the ToC entry 402 specifies whether or not alpha blending is to be applied.

A placement information element 410 in the ToC entry 402 specifies a placement of the respective tile in an image. For example, the placement information 410 can be expressed in the form of an offset from a base address for the image or a portion of the image.

The ToC entry 110 also includes a next ToC entry pointer element 412 that stores a pointer to the next ToC entry. The next ToC entry pointer element 412 identifies the ToC entry for the next tile. The next ToC entry pointers in respective ToC entries 402 allow linking of tiles of an image.

In examples where multiple images (associated with respective ToCs) are combined in a page, then the ToC entries 402 of the multiple ToCs can be linked together, using the next ToC entry pointer elements 412. More specifically, to link multiple images in a page, a ToC entry of the ToC associated with a first page contains a pointer to the next ToC entry that is part of another ToC associated with a second page.

Figure 5:
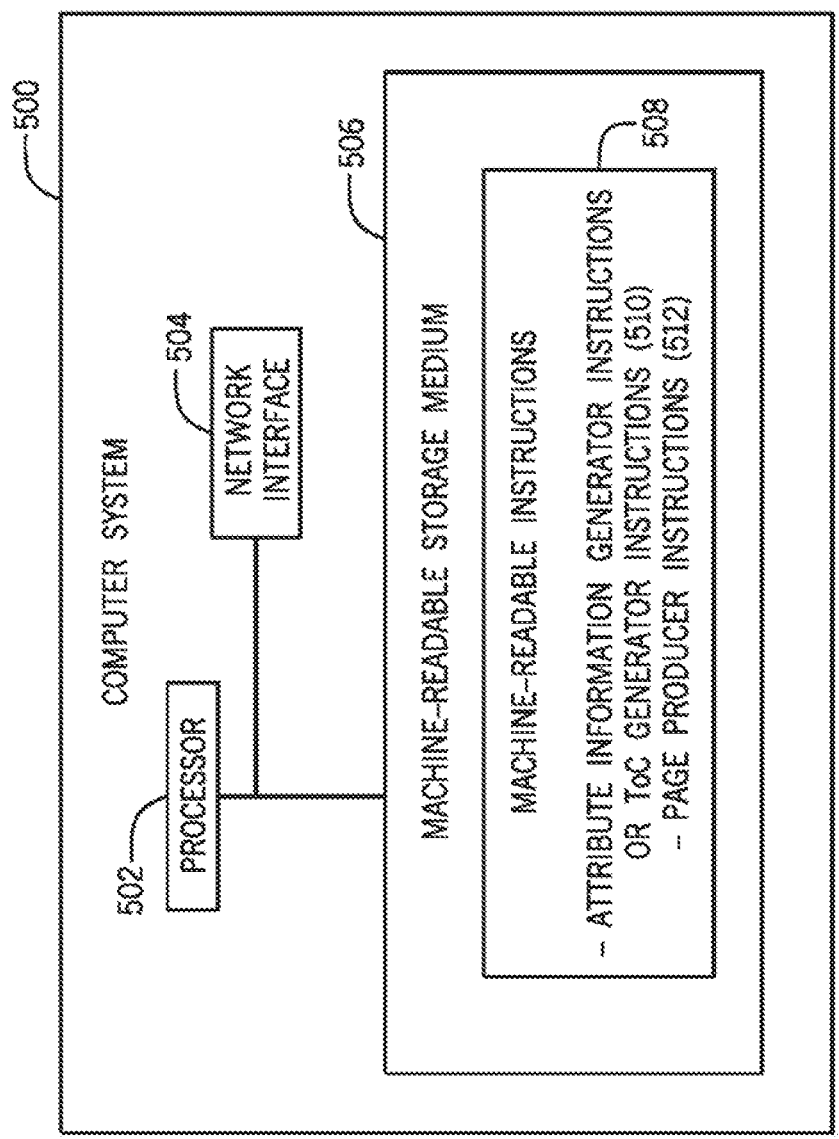
FIG. 5 is a block diagram of an example computer system according to some implementations.

FIG. 5 is a block diagram of an example computer system 500, according to some examples. The computer system 500 can be used to implement a media production system (e.g. 100 of FIG. 1 or 300 of FIG. 3). The computer system 500 includes one or multiple processors 502, which can be coupled to a network interface 504 to allow the computer system 500 to communicate over a network, and a non-transitory machine-readable storage medium (or storage media) 506. The storage medium (or storage media) 506 can store machine-readable instructions 508, which can include one or some combination of instructions associated with various engines discussed above in connection with FIG. 1 or 3. For example, the machine-readable instructions 508 can include instructions 510 of the attribute information generator engine 108 or ToC generator engine 312, and instructions 510 of the page producer 102.

The storage medium (or storage media) 506 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a system including a processor, an image to be shared across a plurality of pages;
computing, by the system, versions of attribute information for the image, each of the versions of the attribute information associated with a respective different page of the plurality of pages,
wherein a first version of the attribute information is associated with a first page of the plurality pages and is different from a second version of the attribute information that is associated with a second page of the plurality of pages, and
each version of the attribute information specifying a respective arrangement of at least a portion of the image in the respective page of the plurality of pages; and
producing, by the system, the plurality of pages for output on a single device according to the respective versions of the attribute information,
wherein the produced plurality of pages includes the first page configured according to the first version of the attribute information and the second page configured according to the second version of the attribute information.

2. The method of claim 1, wherein producing the plurality of pages for output that each includes the at least a portion of the image is performed without duplicating any part of the image in a memory of the system.

3. The method of claim 1, further comprising:
dividing the image into a plurality of tiles, wherein each of the versions of the attribute information includes multiple metadata for the corresponding tiles.

4. The method of claim 3, wherein each of the versions of the attribute information includes a data structure comprising a plurality of entries, each of the entries including metadata for a corresponding one of the tiles.

5. The method of claim 4, wherein each of the entries further includes a pointer to a next entry of the data structure, and wherein a given page of the plurality of pages comprises multiple images including the image to be shared, wherein each of the multiple images is associated with a respective data structure comprising entries each including metadata for a respective tile of the respective image, and
wherein to link a first image of the multiple images with a second image of the multiple images, an entry of the data structure associated with the first image includes a pointer to an entry of the data structure associated with the second image.

6. The method of claim 3, wherein the multiple metadata specify positions of the corresponding tiles.

7. The method of claim 3, wherein producing a given page of the plurality of pages comprises arranging the tiles in the given page using the multiple metadata of a respective one of the versions of the attribute information.

8. The method of claim 3, further comprising:
compressing the tiles and storing the compressed tiles in a storage medium; and
accessing the compressed tiles for producing the plurality of pages.

9. A system comprising:
at least one processor to:
divide an image into a plurality of tiles;
generate a plurality of versions of attribute information for the plurality of tiles, and associate the plurality of versions of the attribute information with respective pages that share at least one tile of the image, the plurality of versions including a first version associated with a first of the pages that differs from a second version associated with a second of the pages;
arrange the shared at least one tile in the respective pages that share the at least one tile according to the plurality of versions of the attribute information for the respective pages; and
produce the respective pages for output on a single device, wherein the produced pages include the shared at least one tile according to the arrangement.

10. The system of claim 9, wherein each version of the attribute information specifies positions and orientations of the tiles.

11. The system of claim 9, wherein the at least one processor is to further:
arrange the shared at least one tile in a second page for output using another respective one of the versions of the attribute information, wherein the at least one tile is arranged differently in the second page than in the first page.

12. The system of claim 9, wherein the shared at least one tile of the image is included in the first page that also includes another image.

13. An article comprising at least one non-transitory machine-readable storage medium storing instructions that upon execution cause a system to:
receive an image to be shared across a plurality of pages;
compute versions of a data structure for the image, each of the versions of the data structure associated with a respective different page of the plurality of pages, the data structure including metadata for the image, each version of the data structure specifying a respective arrangement of at least a portion of the image in the respective page of the plurality of pages, wherein a first version of the data structure associated with a first page of the plurality of pages is different from a second version of the data structure associated with a second page of the plurality of pages; and
produce the plurality of pages for output on a single device according to the respective versions of the data structure.

14. The article of claim 13, wherein the image is divided into a plurality of tiles, and the data structure comprises a plurality of entries including metadata for the respective tiles, the metadata of each of the plurality of entries including position information for the respective tile.

* * * * *